(12) United States Patent
Watanabe

(10) Patent No.: US 7,522,233 B2
(45) Date of Patent: Apr. 21, 2009

(54) DISPLAY DEVICE

(75) Inventor: Hisashi Watanabe, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/797,270

(22) Filed: May 2, 2007

(65) Prior Publication Data

US 2007/0206128 A1 Sep. 6, 2007

Related U.S. Application Data

(63) Continuation of application No. 10/920,168, filed on Aug. 18, 2004, now Pat. No. 7,245,335.

(30) Foreign Application Priority Data

Aug. 20, 2003 (JP) ............................. 2003-296179

(51) Int. Cl.
*G02F 1/1335* (2006.01)
(52) U.S. Cl. ............................ 349/64; 349/95; 349/114
(58) Field of Classification Search ............. 349/61–65, 349/95, 113–114
See application file for complete search history.

(56) References Cited

U.S. PATENT DOCUMENTS

| | | | |
|---|---|---|---|
| 6,195,140 B1 | 2/2001 | Kubo et al. | |
| 6,643,067 B2 | 11/2003 | Miyamae et al. | |
| 7,245,335 B2 | 7/2007 | Watanabe | |

FOREIGN PATENT DOCUMENTS

| | | |
|---|---|---|
| JP | 2-12224 | 1/1990 |
| JP | 06-180444 | 6/1994 |
| JP | P2000-298267 | 10/2000 |
| JP | 2002-333619 | 11/2002 |
| JP | 2003-255318 | 9/2003 |

OTHER PUBLICATIONS

U.S. Appl. No. 10/920,168, filed Aug. 18, 2004.
Kalantar et al., "Functional Light-Guide Plate Characterized by Direct Light-Extraction Microstructures for Luminance Enhancement of the Transmissive and Transflective LCD Backlight Units", IDW '02, Proceedings of the Ninth International Display Workshops, Dec. 4-6, 2002, International Conference Center Hiroshima, Hiroshima, Japan.

*Primary Examiner*—Dung T. Nguyen
(74) *Attorney, Agent, or Firm*—Nixon & Vanderhye P.C.

(57) ABSTRACT

In a display device, a backlight unit emits light forward. Picture elements are arranged in columns and rows to define a picture element plane and each of the picture elements has a transmitting region to transmit light coming from the backlight unit. Collecting elements are arranged in front of the backlight unit to transmit and collect the light on the picture element plane. Each collecting element is associated with the transmitting region of one of the picture elements. The light transmitted through each collecting element forms a beam spot on the picture element plane. The center of the beam spot is located within the transmitting region associated with the collecting element. Two beam spots, formed on two picture elements that are adjacent to each other in a row direction, have their centers of mass shifted from each other in a column direction on the picture element plane.

9 Claims, 10 Drawing Sheets

DISPLAY DEVICE

This application is a Continuation of application Ser. No. 10/920,168, filed Aug. 18, 2004, now U.S. Pat. No. 7,245,335 the entire content of which is hereby incorporated herein by reference in this application.

BACKGROUND OF THE INVENTION

1. Field of the Invention

The present invention generally relates to a display device and more particularly relates to a non-emissive display device that conducts a display operation using the light emitted from a backlight unit.

2. Description of the Related Art

Examples of non-emissive display devices include liquid crystal displays (LCDs), electrochromic displays, and electrophoretic displays. Among other things, LCDs are currently used extensively in personal computers, cell phones and many other electronic devices.

An LCD is designed to display images, characters and so on by changing the optical properties of its liquid crystal layer at the openings of its picture element electrodes, which are regularly arranged in a matrix pattern, with drive voltages applied to those electrodes. Also, in the LCD, each picture element includes a thin-film transistor (TFT) as a switching element in order to control the respective picture elements independently of each other.

However, if each picture element includes a transistor, then the area of each picture element decreases and the brightness drops.

Furthermore, considering their electrical performance, manufacturing techniques and other constraints, it is difficult to reduce the sizes of switching elements and interconnects to less than certain limits. For example, an etching precision achieved by a photolithographic process is usually about 1 μm to about 10 μm. Accordingly, as the definition of an LCD has been further increased and as the size thereof has been further decreased, the picture element pitch becomes smaller and smaller. As a result, the aperture ratio further decreases and the brightness further drops.

To overcome this low-brightness problem, according to a proposed method, a collecting element may be provided for each of the huge number of picture elements of an LCD so that the light emitted from a backlight unit is collected on each of those picture elements.

For example, Japanese Laid-Open Publication No. 2-12224 discloses a transmissive color LCD that uses microlenses. In the LCD of that type, a number of microlenses are arranged as densely as possible on a two-dimensional plane, thereby realizing a bright display as shown in FIG. 15B. Since the microlenses are arranged in such a densest possible pattern, R, G and B color filters (and their associated picture elements) are arranged in a delta pattern such that every set of RGB color filters on a row is shifted from its associated set of RGB color filters on the previous row by one and a half pitches as shown in FIG. 15A. That is to say, the ratio of the picture element pitch in the x direction (i.e., row direction) to the picture element pitch in the y direction (i.e., column direction) is $2:\sqrt{3}$.

However, to realize the microlens arrangement disclosed in Japanese Laid-Open Publication No. 2-12224, the picture elements of an LCD need to be arranged in the delta pattern at the predetermined pitch.

An LCD with such a delta picture element arrangement achieves the display of a natural video, and therefore, can be used effectively in TV sets, camera finders and so on. However, to present characters, figures and other objects including a lot of lines on personal computers, cell phones and so on, the LCD preferably adopts not so much the delta arrangement as a striped arrangement. In the striped arrangement, normally three rectangular R, G and B picture elements make up one substantially square pixel as shown in FIG. 16. The microlens arrangement of Japanese Laid-Open Publication No. 2-12224 cannot be applied to any LCD with this striped arrangement.

There is an increasing demand for further improvement of optical efficiency in various other non-emissive display devices as well, not just the LCDs described above.

SUMMARY OF THE INVENTION

In order to overcome the problems described above, an object of the present invention is to provide a display device that can improve the optical efficiency without being limited by the arrangement of picture elements by modifying the arrangement of collecting elements (i.e., light-collecting elements or optical condensing elements) associated with the picture elements.

A display device according to a preferred embodiment of the present invention preferably includes a backlight unit, a plurality of picture elements, and a plurality of collecting elements. The backlight unit preferably emits light forward. The picture elements are preferably arranged in columns and rows to define a picture element plane and each of the picture elements preferably has a transmitting region to transmit the light that has come from the backlight unit. The collecting elements are preferably arranged in front of the backlight unit to transmit and collect the light on the picture element plane. Each and every one of the collecting elements is preferably associated with the transmitting region of one of the picture elements. The light that has been transmitted through each said collecting element preferably forms a beam spot on the picture element plane. The center of the beam spot is preferably located within the transmitting region associated with the collecting element. Two beam spots, which are formed on two of the picture elements that are adjacent to each other in a row direction, preferably have their centers of mass shifted from each other in a column direction on the picture element plane.

In one preferred embodiment of the present invention, the picture elements are preferably arranged at a pitch P1 in the row direction and include first, second and third picture elements that are adjacent to each other in the row direction. In the first, second and third picture elements, the size of the collecting element associated with the transmitting region of at least the first picture element is preferably greater than P1 as measured in the row direction.

In this particular preferred embodiment, the size of the collecting element associated with the transmitting region of the second picture element and the size of the collecting element associated with the transmitting region of the third picture element are preferably both greater than P1 as measured in the row direction.

In another preferred embodiment, the picture elements are preferably arranged at a pitch P1 in the row direction and preferably include first, second and third picture elements that are adjacent to each other in the row direction. As measured in the row direction, the size of the collecting element associated with the transmitting region of the first picture element is preferably different from that of the collecting element associated with the transmitting region of the second picture element.

In still another preferred embodiment, the display device may further include a color filter layer including red, green and blue color filters, which are arranged in a striped pattern.

In yet another preferred embodiment, the collecting elements may make up an array of microlenses.

In yet another preferred embodiment, each said picture element may have a liquid crystal layer.

In that case, each said picture element preferably has a reflecting region to reflect the light that has come from the front of the display device can selectively conduct a display operation either in a transmission mode or in a reflection mode.

More specifically, the transmitting region of each said picture element is preferably arranged such that the center of the transmitting region substantially matches that of the beam spot.

A display device according to a preferred embodiment of the present invention modifies the arrangement of collecting elements, which are associated with respective picture elements, thereby improving the optical efficiency without being limited by the arrangement of picture elements, for example. Also, in a preferred embodiment, the brightness of a particular color is increased, thereby changing the brightness on a color-by-color basis and realizing an even more viewable display. Also, when the present invention is implemented as a transflective LCD, the brightness ratio between the reflection and transmission modes can be changed without changing the area ratio between reflective and transmissive electrodes.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, preferred embodiments of the present invention will be described with reference to the accompanying drawings.

The following illustrative embodiments of the present inventions are supposed to be applied to a semi-transmissive (or transflective) LCD. However, the present invention is in no way limited to those specific preferred embodiments but may be naturally applicable for use in non-transflective LCDs such as a transmissive LCD. Furthermore, the present invention can also be used effectively in electrophoretic displays and other non-LCD displays.

A transflective LCD has recently been developed as an LCD that can be used effectively even in a bright environment and may be applicable for use in a cell phone, for example. In the transflective LCD, each picture element includes a transmitting region to transmit the light coming from a backlight and a reflecting region to reflect the ambient light. Thus, the transflective LCD can switch its modes of display according to the operating environment from transmission mode into reflection mode, or vice versa, and may even use both of these modes at the same time. A transflective LCD is disclosed more fully in Japanese Laid-Open Publication No. 11-109417, for example.

A conventional transflective LCD needs a relatively broad reflecting region. Accordingly, the ratio of the area of the transmitting region to that of each picture element may decrease so much that the brightness may drop in the transmission mode. However, the transflective LCD of the following preferred embodiment of the present invention can increase the brightness in the transmission mode with the decrease in brightness in the reflection mode minimized.

Figure 1:
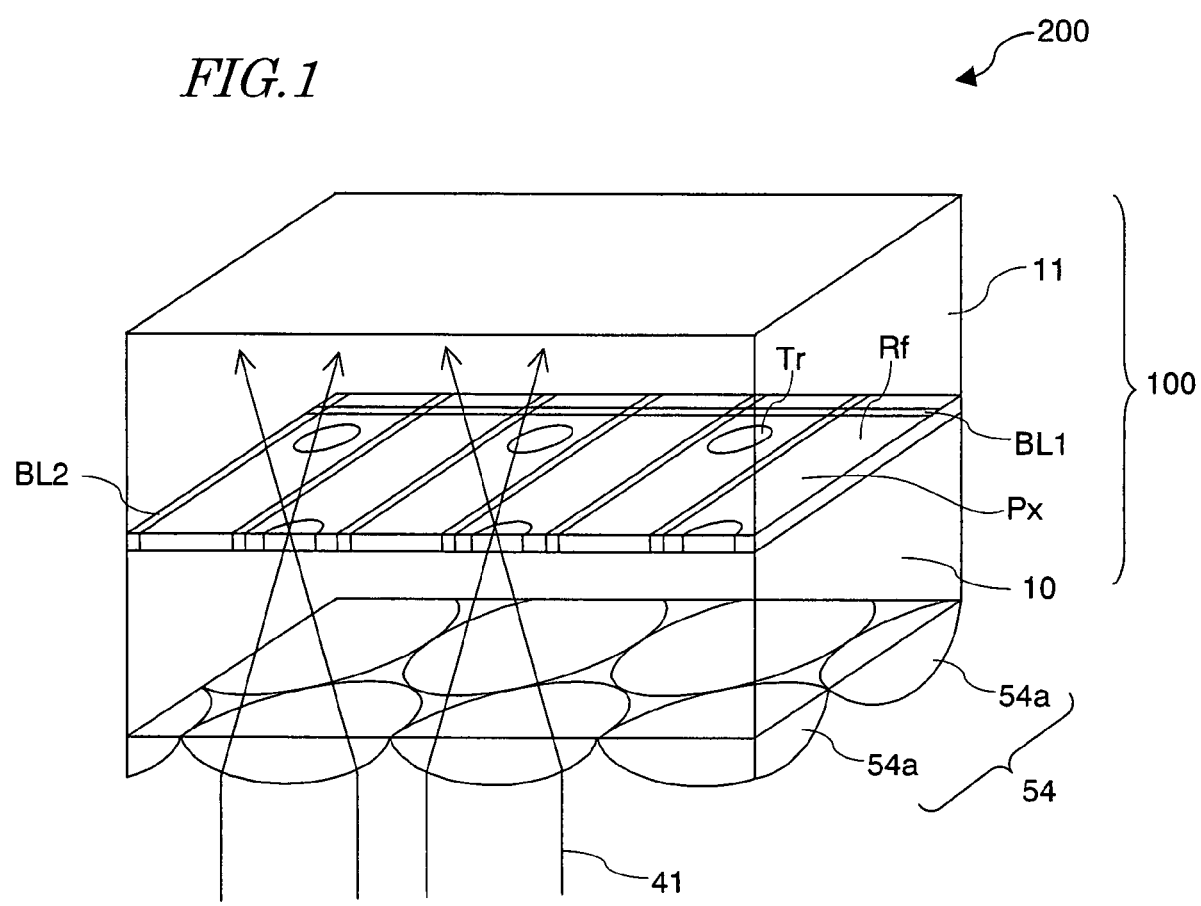
FIG. 1 is a perspective view schematically illustrating a transflective LCD according to a specific preferred embodiment of the present invention.

FIG. 1 schematically illustrates a transflective LCD 200 according to a specific preferred embodiment of the present invention.

The transflective LCD 200 includes a backlight unit 50 (not shown in FIG. 1 but in FIG. 8), a group 54 of collecting elements provided in front of the backlight unit 50, and a display panel 100 provided in front of the group of collecting elements 100. It should be noted that when some member is located "in front of" another member, the former member is supposed herein to receive the light from the backlight unit later than the latter member does.

The display panel 100 includes a pair of transparent substrates 10 and 11 and a plurality of picture elements Px that are arranged in columns and rows between those substrates 10 and 11. The picture elements Px include R, G and B picture elements that emit red, green and blue light rays, respectively. Each of those picture elements Px is defined by a light shielding layer (i.e., black matrix) BL1 extending in the row direction and another light shielding layer BL2 extending in the column direction. The light shielding layer BL1 may be defined by gate lines 1 (see FIG. 13) while the light shielding layer BL2 may be defined by data lines 2 (see FIG. 13, too).

Figure 16:
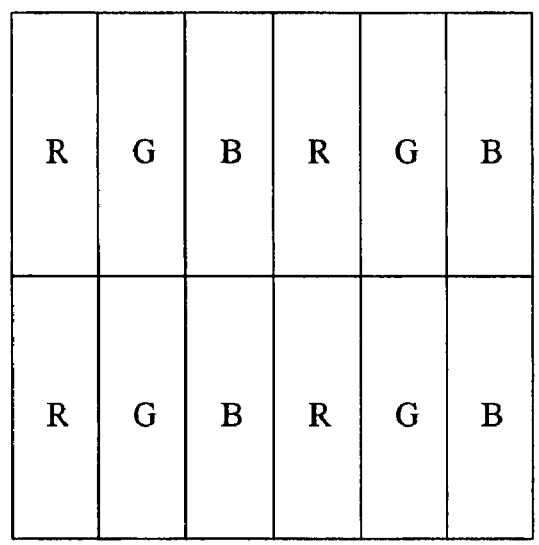
FIG. 16 is a schematic representation showing a striped picture element arrangement.

The display panel 100 further includes a color filter layer (not shown) including red (R) color filters, green (G) color filters and blue (B) color filters. These R, G and B color filters are arranged in stripes as shown in FIG. 16. Three picture elements Px, which are adjacent to each other in the row direction, transmit R, G and B light rays through the R, G and B color filters, respectively, and together make up one pixel. Each of those picture elements Px includes a transmitting region Tr and a reflecting region Rf. The transmitting region Tr is a region to conduct a display operation in transmission mode, while the reflecting region Rf is a region to conduct a display operation in reflection mode.

In the transflective LCD 200, the group 54 of collecting elements includes a plurality of collecting elements 54a, each of which is associated with the transmitting region Tr of one of the picture elements Px. In this preferred embodiment, an array of microlenses is provided as the group 54 of collecting elements 54a.

In the microlens array 54, each of the microlenses 54a is provided for the transmitting region Tr of its associated picture element Px. A light ray 41, passing through a microlens 54a, form a beam spot on a plane that is defined by the picture elements (which will be sometimes referred to herein as a "picture element plane") and the center of that beam spot is located within the transmitting region Tr of its associated picture element Px.

In this preferred embodiment, each color light ray is collected within the transmitting region Tr of its associated picture element Px. However, not every color ray has to be collected within the transmitting region Tr but a color ray that has passed through a microlens 54a may be collected at a point that is closer to the microlens 54a than to the picture element plane. Alternatively, another color ray that has passed through another microlens 54a may be collected at a point that is more distant from the microlens 54a than the picture element is. Still, each color ray is preferably collected within the transmitting region Tr of its associated picture element, because the brightness can be kept high enough even when the area of the transmitting region Tr is reduced.

It should be noted that the "beam spot" refers to herein the beam cross section (or profile) of a color ray on the picture element plane unless stated otherwise. Thus, the "beam spot" does not necessarily mean a "focal point" (i.e., a point at which the color ray has the smallest cross section). Also, the "center of the beam spot" is defined herein in view of the light intensity distribution on the picture element plane and corresponds to the center of mass of a piece of paper, of which the shape is defined by the beam cross section of the beam spot and which has a density distribution corresponding to the light intensity distribution. If the light intensity distribution is symmetric with respect to the geometric center of the beam cross section of the beam spot, then the "center of the beam spot" matches the geometric center. However, if the light intensity distribution is asymmetric due to the aberration of the microlens, for example, then the "center of the beam spot" deviates from the geometric center.

The transflective LCD 200 of this preferred embodiment is characterized by arranging the collecting elements in a predetermined pattern such that two beam spots, which are formed on two of the picture elements that are adjacent to each other in the row direction, have their centers of mass shifted from each other in the column direction on the picture element plane.

In this case, the "center of mass" of a beam spot matches the "center" of the beam spot if a single beam spot center is formed on a single picture element. However, if multiple beam spot centers are formed on a single picture element, then the "center of mass" of the beam spot is defined with respect to those beam spot centers.

Hereinafter, the specific arrangement of the microlens array in the LCD of this preferred embodiment will be described more fully with reference to FIGS. 2 through 7, which are plan views of the microlens array as viewed perpendicularly to the display screen. In FIGS. 2 through 7, the center of each microlens is supposed to match that of its associated beam spot for the sake of simplicity.

Figure 2:
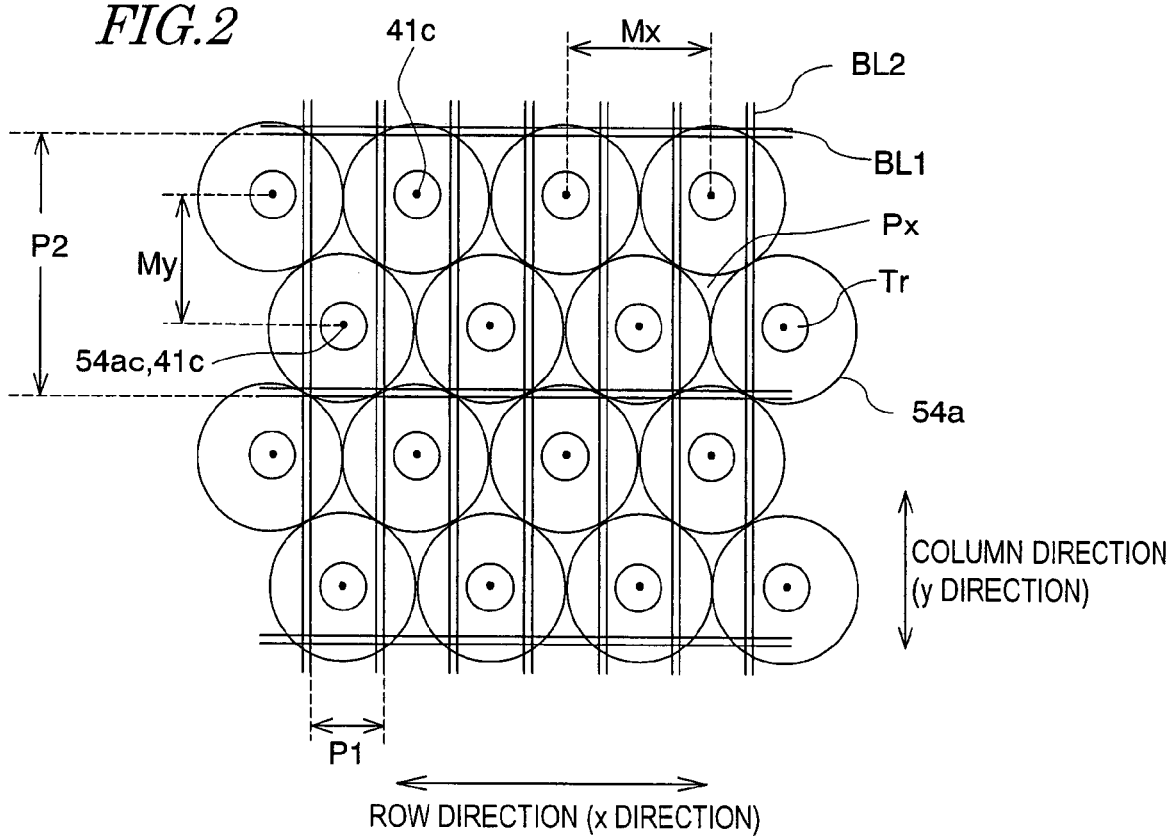
FIG. 2 is a plan view schematically illustrating an exemplary positional relationship among a microlens, the center of a beam spot and its associated transmitting region in the LCD shown in FIG. 1.

FIG. 2 is a plan view schematically illustrating an exemplary positional relationship among a microlens 54a, the center 41C of a beam spot and its associated transmitting region Tr in the LCD 200. The picture elements are arranged in stripes at a pitch P1 in the row direction and at a pitch P2 in the column direction. Three picture elements Px that are adjacent to each other in the row direction transmit R, G and B light rays, respectively, and together make up one pixel. The microlenses 54a are arranged such that the center 41C of each beam spot is formed within its associated transmitting region Tr and substantially matches the center of that transmitting region Tr. In the example illustrated in FIG. 2, the microlenses are arranged as densely as possible with respect to the picture elements that are arranged in stripes.

A single beam spot center 41C is formed in each picture element Px. Thus, the center 41C of each beam spot matches the center of mass thereof. As shown in FIG. 2, the respective centers 41C of multiple beam spots are arranged in a zigzag pattern along a row of picture elements. The centers 41C of beam spots on two arbitrary picture elements Px, which are adjacent to each other in the row direction, are shifted from each other in the column direction. In other words, there is no pair of beam spots, of which the centers 41C are aligned with each other in the column direction. By arranging the microlenses such that the center of the microlenses (i.e., the centers of beam spots), associated with two adjacent picture elements on a row, are shifted from each other in the column direction in this manner, the microlenses can also be arranged as densely as possible even with respect to picture elements that are arranged in stripes. In the arrangement disclosed in Japanese Laid-Open Publication No. 2-12224 mentioned above, the centers of microlenses (i.e., the centers of beam spots), associated with each row of picture elements, are aligned with each other in the column direction. Thus, to arrange the microlenses as densely as possible, the picture elements need to be arranged in a delta pattern as described above.

As shown in FIG. 2, the beam spot centers 41C are arranged in a zigzag pattern such that two rows of beam spot centers 41C are formed on each row of picture elements so as to be located at two mutually different levels in the column direction. On each of the two rows of beam spot centers 41C, the beam spot centers 41C are arranged at a pitch Mx of 2P1 in the row direction. That is to say, on the same row of picture elements, the two rows of beam spot centers 41C have their pitches shifted by Mx/2 (=P1). Also, in this preferred embodiment, the picture elements Px and beam spot centers 41C are arranged such that their pitches P2 and My in the column direction satisfy P2=2My. Accordingly, the microlenses 54a with a circular cross section can be arranged in an ideal pattern (i.e., as densely as possible) on a plane that is parallel to the display screen. The microlenses 54a shown in FIG. 2 satisfy Mx:My=2: $\sqrt{3}$ and the fill density of the microlenses 54a on a microlens array plane (i.e., a plane that is defined parallel to the display screen) is maximized at $\pi\sqrt{3}/6$=0.906. Accordingly, 90.6% of the overall quantity of light that has been incident from the backlight unit 50 on the display panel 100 can be collected onto associated transmitting regions and can be used for display purposes. For that reason, even if the area of each transmitting region were reduced as the definition of a liquid crystal panel is further increased, a bright transmission mode could still be achieved. Also, even if the area ratio of each transmitting region to its associated picture element Px were reduced to increase the brightness in a reflection mode, a bright transmission mode could still be achieved, too. Furthermore, the brightness ratio between the reflection and transmission modes can be changed without changing the area ratio between the reflective and transmissive electrodes by modifying the lens design.

Figure 4:
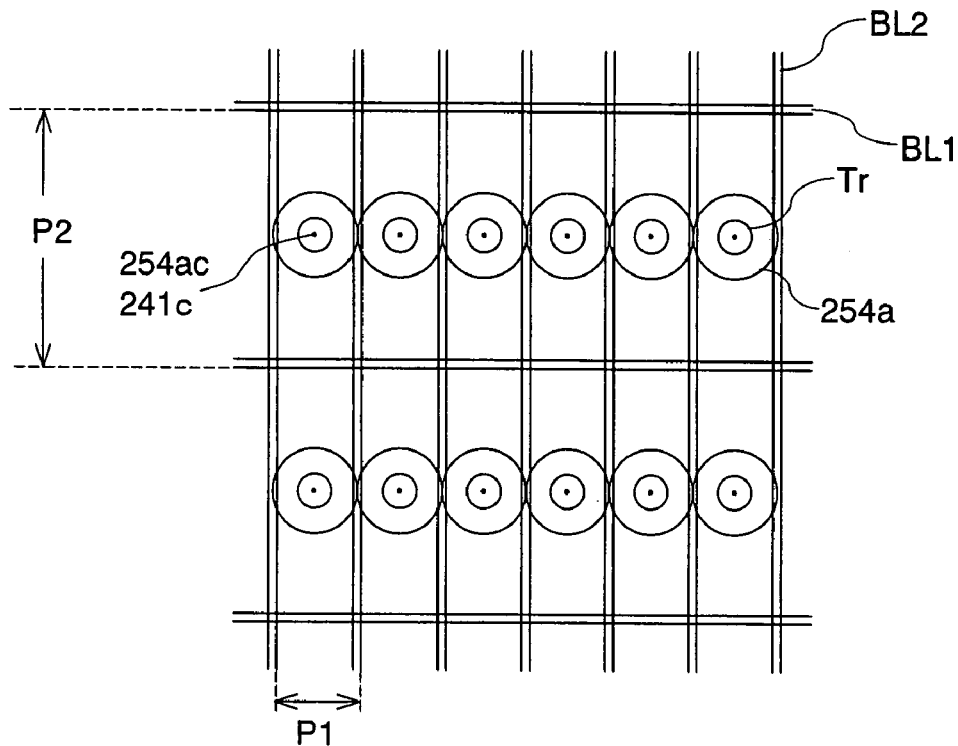
FIG. 4 is a plan view schematically illustrating the arrangement of microlenses and centers of beam spots in a comparative example.
Figure 5:
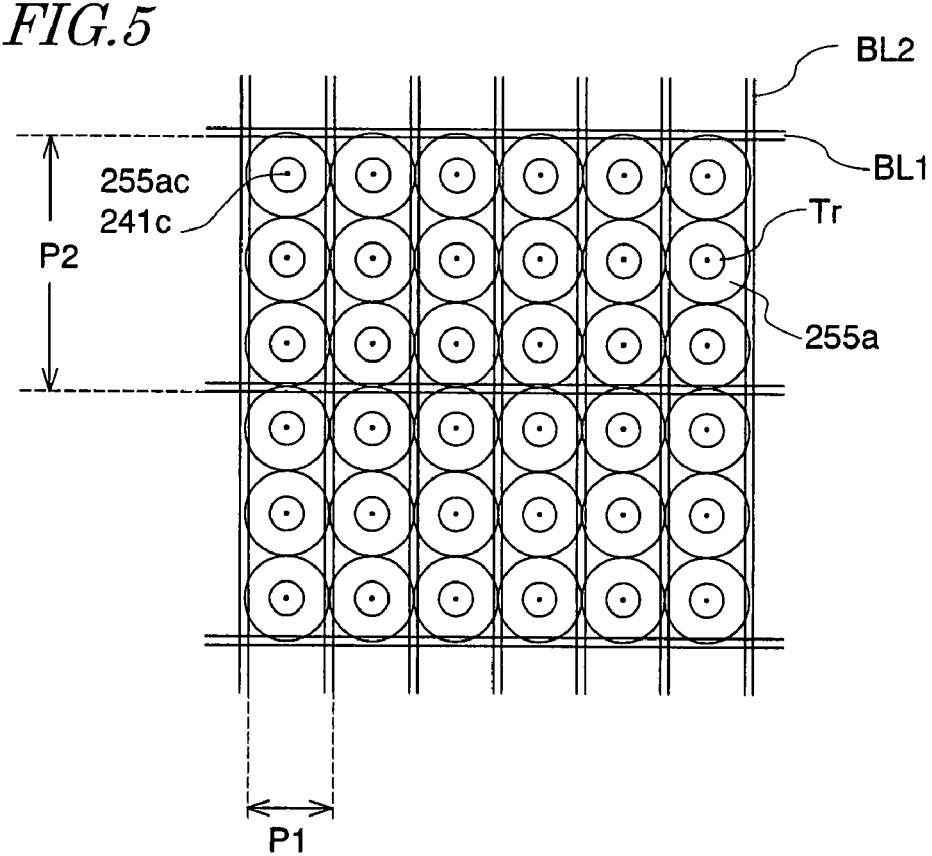
FIG. 5 is a plan view schematically illustrating the arrangement of microlenses and centers of beam spots in another comparative example.

FIGS. 4 and 5 are plan views schematically illustrating exemplary arrangements of microlenses and beam spot centers in comparative examples.

In the microlens arrangement shown in FIG. 4, if the ratio of the picture element pitch P1 in the row direction to the picture element pitch P2 in the column direction is 1:3 as in a normal arrangement, the microlenses 254a have a fill density of at most $\pi/12$=0.262. Accordingly, the maximum quantity of light that can be used in the transmission mode display operation is 26.2% of the overall quantity of light that has been incident on the liquid crystal panel from the backlight unit.

In the arrangement shown in FIG. 5 in which three microlenses 255a are arranged for each picture element Px, if P1:P2=1:3, the microlenses 255a have a fill density of at most $\pi/4$=0.785. Accordingly, the maximum quantity of light that can be used in the transmission mode display operation is 78.5% of the overall quantity of light that has been incident on the liquid crystal panel from the backlight unit.

Figure 3:
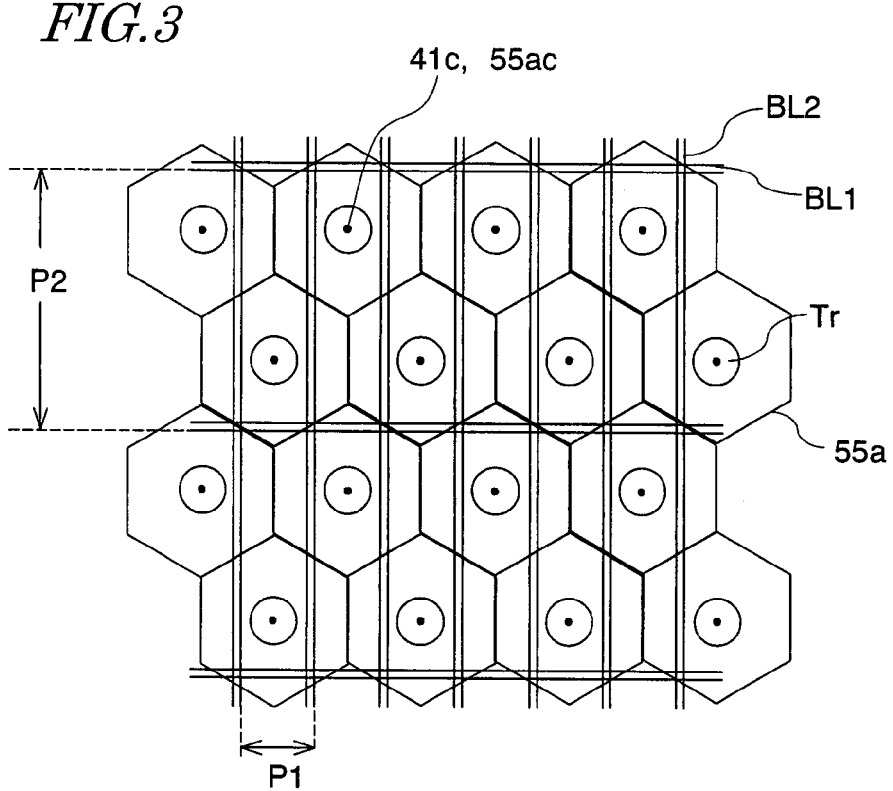
FIG. 3 is a plan view schematically illustrating another exemplary positional relationship among a microlens, the center of a beam spot and its associated transmitting region in the LCD shown in FIG. 1.

In the example illustrated in FIG. 2, each microlens has a circular cross section on a plane that is defined parallel to the display screen. However, the lenses to be used in the LCD 200 do not have to have such a circular cross section. Alternatively, the lenses may have a hexagonal cross section as shown in FIG. 3, for example. In the microlens array shown in FIG. 3, multiple rectangular hexagonal microlenses 55a are arranged in a honeycomb pattern. This microlens array is designed such that every side of each microlens 55a contacts with a side of an adjacent microlens 55a. Accordingly, on the microlens array plane, the microlenses 55a can be arranged at a fill density of almost 100%. Consequently, compared to the microlenses 54a shown in FIG. 2, the lens fill density can be further increased and a brighter transmission mode is realized.

Thus, it can be seen that the incoming light for the LCD can be used more effectively in the microlens arrangements shown in FIGS. 2 and 3 than in the comparative examples shown in FIGS. 4 and 5.

In the preferred embodiment described above, the picture elements Px are arranged in stripes in the LCD 200. Alternatively, the picture elements Px may also be arranged in a delta pattern, for example.

Figure 6:
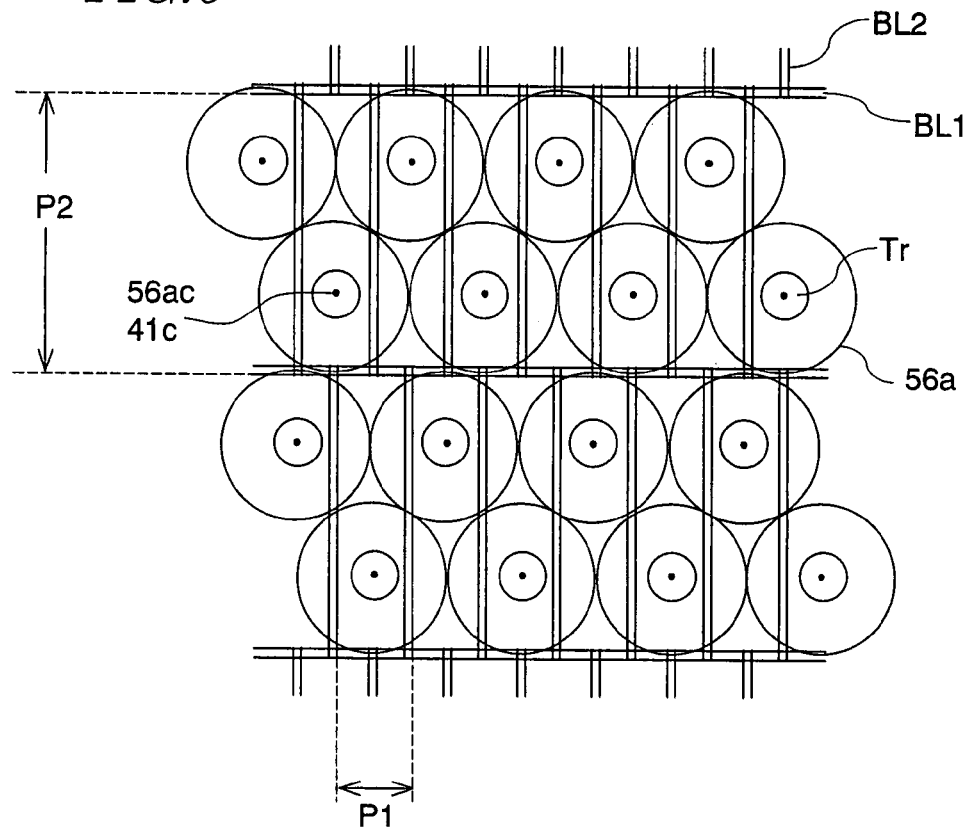
FIG. 6 is a plan view schematically illustrating an exemplary positional relationship among a microlens, the center of a beam spot and its associated transmitting region when the picture elements are arranged in a delta pattern.

FIG. 6 is a plan view schematically illustrating an exemplary positional relationship among a microlens 56a, the center of a beam spot 41C and its associated transmitting region Tr when the picture elements Px are arranged in a delta pattern. Even though the picture elements Px are arranged in such a delta pattern, the beam spot centers 41C shown in FIG. 6 are arranged just like the beam spot centers 41C shown in FIG. 2.

In the preferred embodiments of the present invention described above, the microlenses are arranged either as densely as possible or at least rather densely. However, the present invention is in no way limited to those specific preferred embodiments.

Rather, by getting the centers of microlenses (i.e., the centers of beam spots), associated with two picture elements that are adjacent to each other on a picture element row, shifted from each other in the column direction, the microlenses can be arranged in various other patterns and numerous effects are achievable.

First, as already described for the densest possible arrangement, the diameter of the microlens 54a may be greater than the picture element pitch P1 in the row direction. Accordingly, the optical efficiency can be increased by using bigger microlenses than those shown in FIGS. 4 and 5 without being limited by the picture element pitch P1.

In the examples illustrated in FIGS. 2, 3 and 6, the size of each of the multiple microlenses as measured in the row direction is greater than the picture element pitch P1. However, the present invention is in no way limited to those specific preferred embodiments. If the size of each microlens as measured in the row direction is greater than the picture element pitch P1, then the light coming from the backlight unit can be collected on the transmitting region more effectively compared to the situation where that size is less than the pitch P1. Nevertheless, the size of the microlens may be appropriately determined according to the area ratio of the transmitting region to the picture element Px and the location of the transmitting region in the picture element Px. Thus, the size of the microlens in the row direction may be less than the picture element pitch P1. Even so, the brightness ratio between the reflection and transmission modes can be changed without changing the area ratio between the reflective and transmissive electrodes by modifying the lens design, for example.

Alternatively, not all of those microlenses but only selected ones of them may have a bigger size than the picture element pitch P1 in the row direction. For example, by selectively increasing the sizes of microlenses that are associated with the transmitting regions of picture elements in one or two colors among the R, G and B picture elements, the brightness of particular color(s) can be increased. Also, a viewable display may be realized by changing the brightness on a color-by-color basis. Furthermore, if the R, G and B color filters have the same thickness, the decreased brightness of a particular color can be compensated for.

Figure 7:
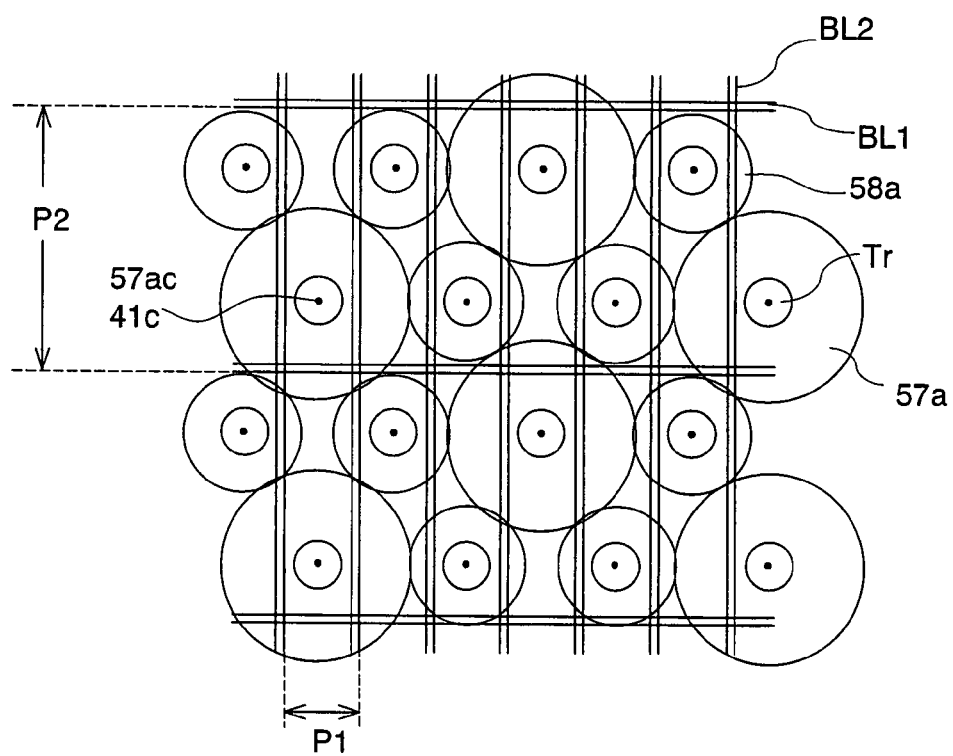
FIG. 7 is a plan view schematically illustrating an exemplary positional relationship among microlenses, beam spot centers and their associated transmitting regions in a situation where only the microlenses associated with the transmitting regions of R, G or B picture elements have an increased diameter.

FIG. 7 is a plan view schematically illustrating an exemplary positional relationship among microlenses 57a and 58a, beam spot centers 41C and their associated transmitting regions Tr in a situation where only the microlenses 57a, associated with the transmitting regions of R, G or B picture elements, have an increased diameter. The beam spot centers formed by the microlenses shown in FIG. 7 are also arranged just like those formed by the microlenses 54a in FIG. 2.

In the examples illustrated in FIGS. 2, 3, 6 and 7, the microlenses are spherical lenses with a circular transmitting region. However, the present invention is in no way limited to those specific preferred embodiments. Alternatively, the microlenses may also be aspherical lenses or Fresnel lenses. Also, the shape of the transmitting region may be appropriately determined according to the beam spot shape, for example.

The microlens preferably has a long focal length (i.e., the distance from the center of the microlens to the focal point). This is because if the focal length is long, the light beam emitted from the backlight unit 50 can be collected on its associated transmitting region Tr just as intended even when the liquid crystal panel 100 includes a relatively thick substrate 10.

The microlens array 54 may be formed by a known method. Specifically, the microlens array 54 can be obtained by performing the following process steps.

First, a die mold, reproducing the shape of the desired microlens array 54 with precision, is prepared. Next, an UV curable resin is injected into the gap between the die mold and the substrate 10 of the liquid crystal panel 100. Subsequently, the UV curable resin injected is exposed to, and cured by, an ultraviolet ray. After the UV curable resin has been cured fully, the die is removed carefully.

According to this method, a microlens array with high optical properties can be manufactured easily with high mass-productivity. The material of the microlens array 54 is preferably a UV curable resin that exhibits high transparency and small birefringence when cured completely. Alternatively, the microlens array may also be formed by an ion exchange method or a photolithographic process.

In the preferred embodiments described above, microlenses are used as the collecting elements. Optionally, prisms or any other type of optical elements may also be used instead.

Hereinafter, the backlight unit 50 and display panel 100 for use in the transflective LCD 200 of this preferred embodiment will be described.

Backlight Unit

The backlight unit 50 for use in this preferred embodiment is a backlight using a single LED as its light source. To get the light coming from the backlight unit 50 collected sufficiently by the collecting element 54, the light emitted from the backlight unit 50 preferably has a high degree of parallelism (e.g., the half width of the brightness of the emitted light is preferably within ±5 degrees). The backlight unit 50 to be described below can emit light with a high degree of parallelism in a predetermined direction.

Figure 8:
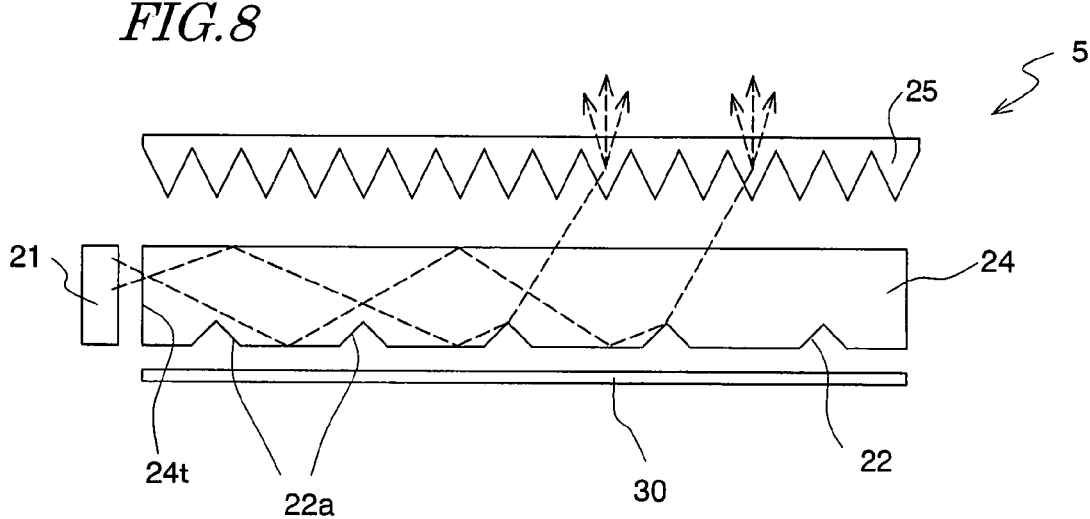
FIG. 8 is a cross-sectional view schematically illustrating a backlight unit for use in the transflective LCD shown in FIG. 1.

As shown in FIG. 8, the backlight unit 50 includes a light guide plate 24, a reflector 30 provided behind the light guide plate 24, an LED 21 arranged close to a corner 24t of the light guide plate 24 (see FIGS. 10 and 12), and a prism sheet 25 provided in front of the light guide plate 24. The backlight unit 50 used in this preferred embodiment is disclosed more fully by Kalil Kalantar et al. in IDW '02, pp. 509-512.

The light emitted from the LED 21 is incident on the light guide plate 24 and reflected internally by the light guide plate 24. As a result, the light is transmitted through almost the entire outgoing plane of the light guide plate 24. The light that has passed through the lower surface of the light guide plate 24 is reflected by the reflector 30, incident on the light guide plate 24 again, and then transmitted through the outgoing plane of the light guide plate 24. The light that has gone out of the light guide plate 24 is incident on the prism sheet 25 and refracted by the prism sheet 25 perpendicularly to the light guide plate 24.

Figure 12:
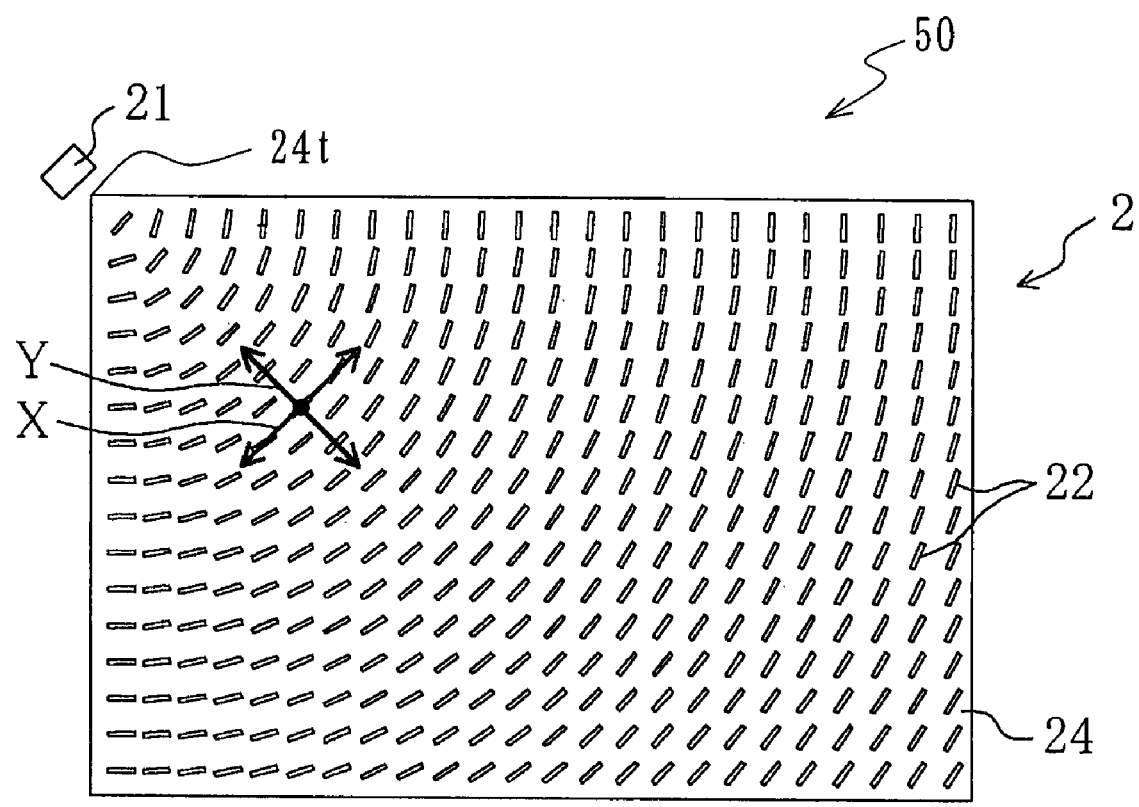
FIG. 12 illustrates the light guide plate of the backlight unit shown in FIG. 8.

The reflector 30 may be made of an aluminum film, for example. The light guide plate 24 may be made of some transparent material such as polycarbonate or polymethyl methacrylate, for example. The light guide plate 24 includes a plurality of prisms 22 for getting the internally incoming light reflected by reflective surfaces 22a and then transmitted through the light guide plate 24. Those prisms 22 are formed on the bottom of the light guide plate 24 and arranged in matrix as shown in FIG. 12. As shown in FIG. 8, each of the prisms 22 has a triangular groove shape with two reflective surfaces 22a. The reflective surfaces 22a of the prisms 22 are provided so as to extend in an X direction (second direction) that is perpendicular to a Y direction (first direction), which is the radial direction of a circle defined around the LED 21 as its center, as shown in FIG. 12. In other words, the prisms 22 are formed as grooves extending in the X direction. The tilt angle of the reflective surfaces 22a is defined such that the internal light in the light guide plate 24 can be efficiently transmitted through the light guide plate 24 perpendicularly. In the example illustrated in FIG. 12, the prisms 22 are arranged at regular intervals for the sake of simplicity. Actually, however, the prisms 22 are preferably designed so as to have their intervals decreased as the light travels farther away from the LED 21.

Figure 9:
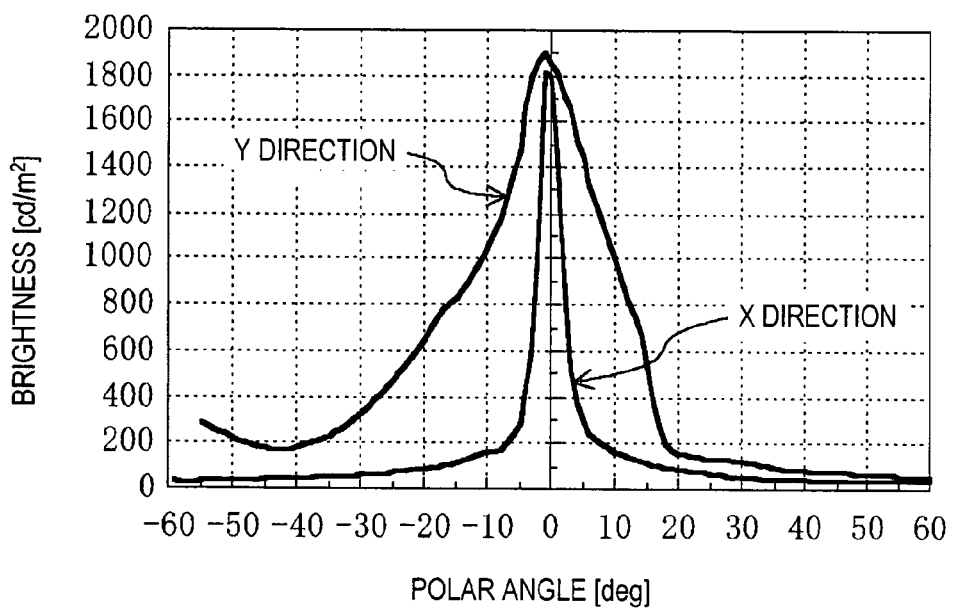
FIG. 9 is a graph showing the optical properties of the backlight unit as measured on the light outgoing plane thereof.
Figure 10:
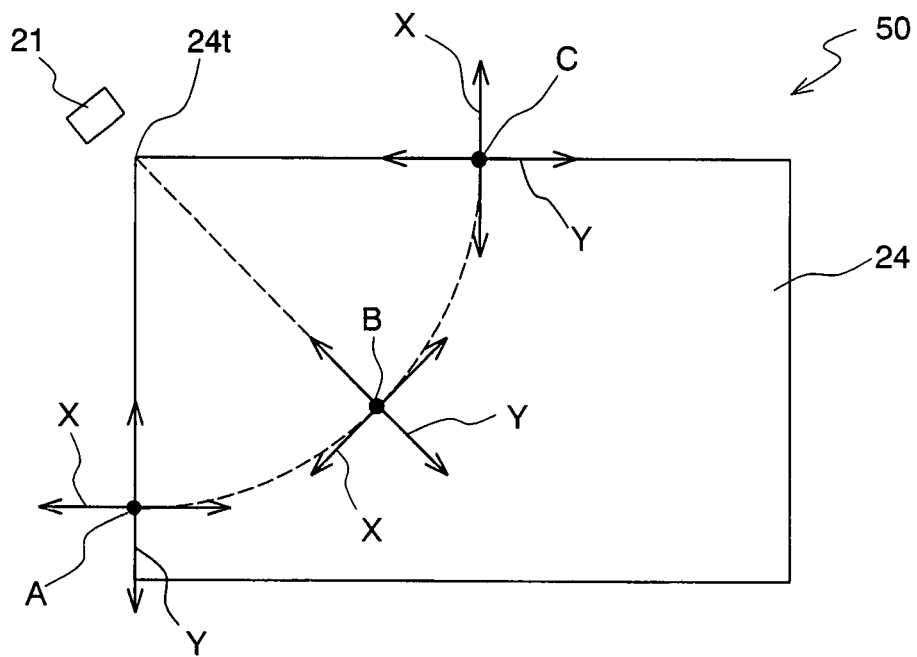
FIG. 10 is a schematic representation showing how to measure the optical properties on the light outgoing plane of the backlight unit.

FIG. 9 shows the optical properties of the backlight unit 50 as measured on the light outgoing plane thereof. The results shown in FIG. 9 were obtained by averaging the brightnesses that were measured at three points A, B and C on three arcs drawn on the light outgoing plane of the backlight unit 50 with the LED 21 defined as their center as shown in FIG. 10. In this case, the radial direction of a circle drawn around the LED 21 as its center is called a "Y direction" and the direction perpendicular to the Y direction is called an "X direction".

Figure 11A:
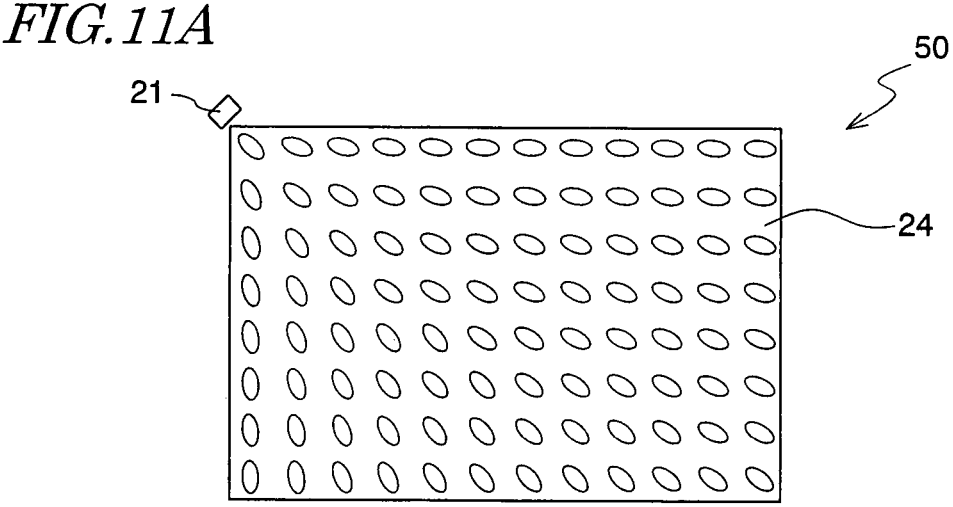
FIG. 11A schematically illustrates the dispersion of the directivity shown in FIG. 9.
Figure 11B:
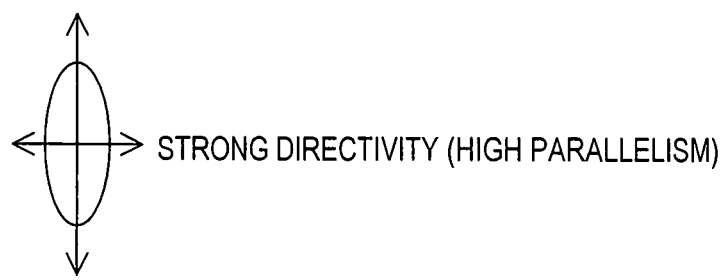
FIG. 11B shows what the ellipses shown in FIG. 11A mean.

As shown in FIG. 9, the brightness of the outgoing light in the X direction has a half width (i.e., FWHM) of about ±3 degrees, while the brightness of the outgoing light in the Y direction has a half width of about ±15 degrees. Thus, it can be seen that the directivity is higher in the X direction than in the Y direction (i.e., the outgoing light in the X direction has a higher degree of parallelism than that in the Y direction). That is to say, definitely there is a difference in directivity between the X and Y directions. Accordingly, the outgoing light exhibits dispersed directivity on the light outgoing plane. FIG. 11A schematically illustrates such a dispersion of directivity. FIG. 11B shows what the ellipses shown in FIG. 11A mean. As can be seen from FIG. 11B, the major-axis direction of the ellipse represents weak directivity (i.e., a low degree of parallelism), while the minor-axis direction of the ellipse represents strong directivity (i.e., a high degree of parallelism).

In this manner, the outgoing light of the backlight unit 50 exhibits different directivities in the X and Y directions on the light outgoing plane. However, by using the microlens array 54, consisting of microlenses 54a having a circular cross section on a plane that is defined parallel to the display screen (see FIGS. 1 and 2), even the high-directivity light in the X direction can be collected sufficiently. As a result, a high-brightness display is realized substantially over the entire display screen of the LCD 200.

It should be noted that the backlight unit for use in this preferred embodiment does not have to have the configuration described above. Alternatively, the LED 21 may be arranged by the center of a side surface of the light guide plate 24 or even two or more LEDs may be used. Optionally, the LED may be replaced with a fluorescent lamp, for example.

Display Panel

Figure 13:
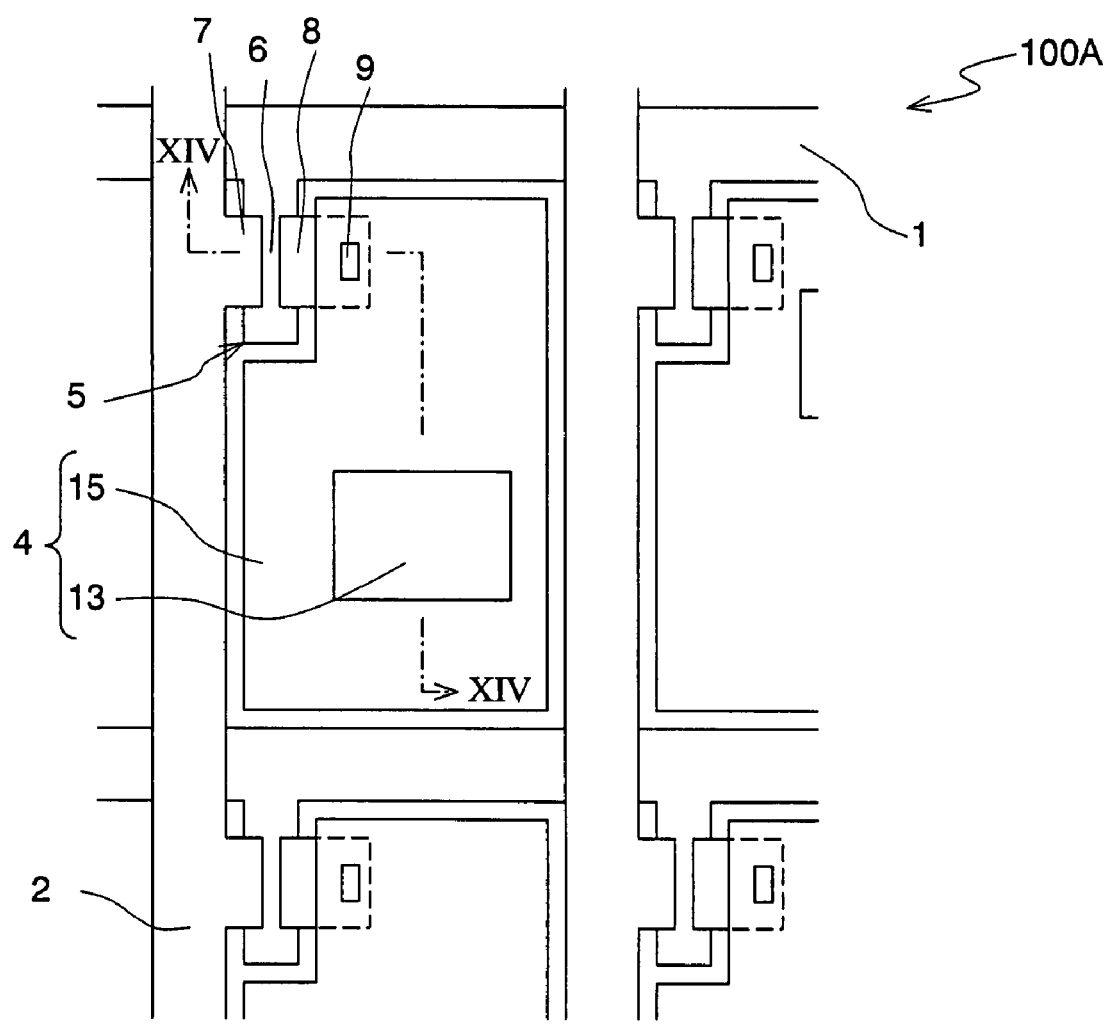
FIG. 13 is a plan view illustrating the TFT substrate of a transflective liquid crystal panel for use in the transflective LCD shown in FIG. 1.
Figure 14:
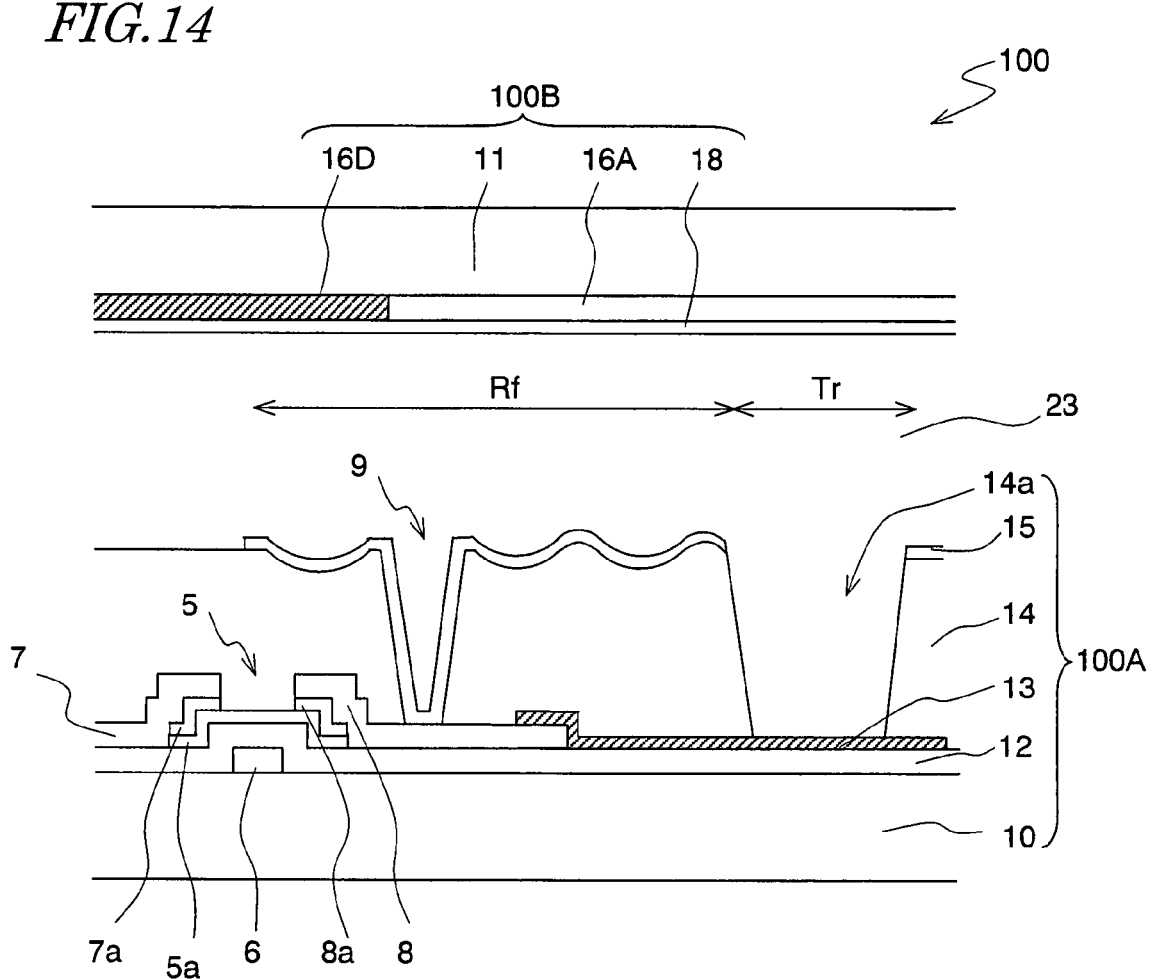
FIG. 14 is a partial cross-sectional view of the liquid crystal panel including the TFT substrate shown in FIG. 13 as viewed on the planes indicated by XIV-XIV in FIG. 13.
Figure 15A:
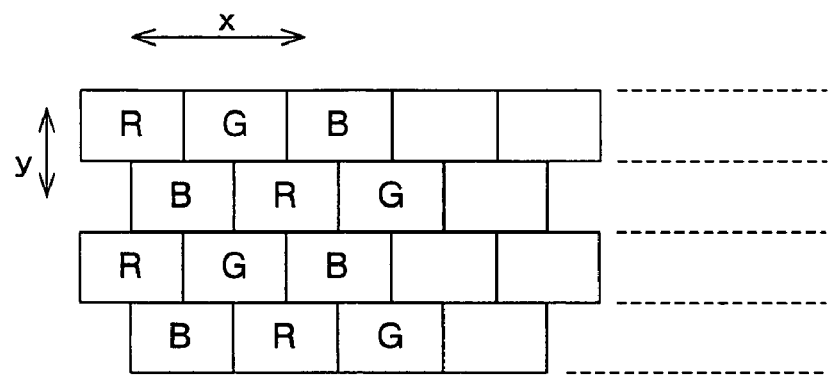
FIG. 15A is a schematic representation showing the delta arrangement of picture elements as disclosed in Japanese Laid-Open Publication No. 2-12224.
Figure 15B:
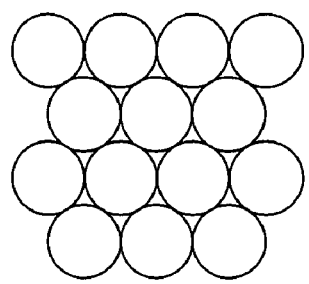
FIG. 15B is a schematic representation showing the lens arrangement thereof.

Hereinafter, the structure and functions of the display panel 100 for use in the transflective LCD 200 shown in FIG. 1 will be described with reference to FIGS. 13 and 14. FIG. 13 is a plan view of the TFT substrate 100A of the display panel 100. FIG. 14 is a partial cross-sectional view of the display panel 100 including the TFT substrate 100A as viewed on the planes indicated by XIV-XIV in FIG. 13.

As shown in FIG. 14, the display panel 100 includes the TFT substrate 100A, a color filter substrate 100B and a liquid crystal layer 23 sandwiched between these two substrates 100A and 100B. A polarizer, a quarter wave plate and/or an alignment film (none of which is shown in FIG. 14) may be provided as needed for the TFT substrate 100A and color filter substrate 100B.

As shown in FIG. 13, the TFT substrate 100A included in the display panel 100 includes thin-film transistors (TFTs) 5, gate bus lines 1 and source bus lines 2 on a transparent substrate of glass, quartz or any other suitable material. As shown in FIGS. 13 and 14, a transparent electrode 13 made of ITO, for example, and a reflective electrode 15 made of Al, for example, are provided within each area surrounded with the two gate bus lines 1 and two source bus lines 2, so as to make up a picture element electrode 4.

The TFT 5 is provided in the vicinity of each intersection between the gate and source bus lines 1 and 2. As shown in FIG. 13, the gate bus line 1 is connected to the gate electrode 6 of the TFT 5 and the source bus line 2 is connected to the source electrode 7 of the TFT 5. Although not shown in FIG. 13, if the picture element electrode 4 is arranged so as to overlap with the gate and source bus lines 1 and 2, the aperture ratio of the picture element can be increased effectively.

As viewed from over the display panel 100 (i.e., perpendicularly to the display screen thereof), each of the multiple picture elements Px arranged in matrix includes a transmitting region Tr and a reflective region Rf. The transmitting region Tr is defined by a region of the TFT substrate 100A that has the electrode function of applying a voltage to the liquid crystal layer 23 and the function of transmitting the incoming light. On the other hand, the reflective region Rf is defined by a region of the TFT substrate 100A that has the electrode function of applying a voltage to the liquid crystal layer 23 and the function of reflecting the incoming light.

On the transparent substrate 10 of the TFT substrate 10A, a gate insulating film 12 is provided so as to cover the gate bus lines 1 (see FIG. 13) and gate electrodes 6. A semiconductor layer 5a is deposited on the gate insulating film 12 so as to be located right over the gate electrodes 6. Also, the semiconductor layer 5a is electrically connected to the source and drain electrodes 7 and 8 by way of semiconductor contact layers 7a and 8a, respectively, thereby making up the TFT 5. The drain electrode 8 of the TFT 5 is electrically connected to the transparent electrode 13 and further connected to the reflective electrode 15 at a contact hole 9 of the resin layer 14. The transparent electrode 13 is provided on the gate insulating film 12 so as to be located around the center of the area surrounded with the gate and source bus lines 1 and 2.

The resin layer 14 with openings 14a that expose the transparent electrodes 13 is deposited thereon so as to cover almost the entire surface of the transparent substrate 10. The reflective electrode 15 is provided on the resin layer 14 so as to surround the openings 14a. The surface of the resin layer 14 on which the reflective electrode 15 is provided has unevenness like a continuous wave. Thus, the reflective electrode 15 also has a similar surface shape and exhibits a moderate diffusion and reflection characteristic. The resin layer 14 with the continuous waveshape surface may be made of a photosensitive resin, for example.

On the transparent substrate 11 (made of glass, quartz or any other suitable material) of the color filter substrate 100B, a color filter layer is provided and a counter electrode (transparent electrode) 18 is further provided thereon so as to face the liquid crystal layer 23. The color filter layer includes red (R) color filters 16A, green (G) color filters, blue (B) color filters and a black matrix 16D filling the gaps between those color filters. In the LCD 200 of this preferred embodiment, the color filters are arranged in stripes as shown in FIG. 16. The counter electrode 18 may be made of ITO, for example.

It should be noted that the display panel to be included in the transflective LCD 200 does not have to have such a configuration but may be any other known display panel. The display panel for use in the transflective LCD 200 does not have to be a color display type but may also be a monochrome display type.

A display device according to any of various preferred embodiments of the present invention described above can increase the optical efficiency without being limited by any particular picture element arrangement and can be used effectively in a non-emissive display device such as an LCD.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This non-provisional application claims priority under 35 USC § 119(a) on Patent Application No. 2003-296179 filed in Japan on Aug. 20, 2003, the entire contents of which are hereby incorporated by reference.

What is claimed is:

1. A display device comprising:
a backlight unit for emitting light forward;
a plurality of picture elements, which are arranged in columns and rows to define a picture element plane and each of which has a transmitting region to transmit the light that has come from the backlight unit; and
a plurality of collecting elements, which are arranged in front of the backlight unit to transmit and collect the light on the picture element plane, each of the collecting elements being associated with the transmitting region of one of the picture elements,
wherein the light that has been transmitted through each said collecting element forms a beam spot on the picture element plane, the center of the beam spot being located within the transmitting region associated with the collecting element,
wherein two beam spots, which are the most closely adjacent beam spots formed on two of the picture elements that are adjacent to each other in a row direction, have their centers of mass shifted from each other in a column direction on the picture element plane, and
wherein the collecting elements and/or the transmitting regions are arranged in a zig-zag pattern with a predetermined pitch across a substantial part of the display device in a certain direction, so that said predetermined pitch and said zig-zag pattern are both provided across the substantial part of the display device.

2. The display device of claim 1, wherein the collecting elements and/or the transmitting regions are arranged in a zig-zag pattern across a substantial part of the display device in a row direction.

3. The display device of claim 1, wherein the picture elements are arranged at a pitch P1 in the row direction and include first, second and third picture elements that are adjacent to each other in the row direction, and wherein in the first, second and third picture elements, the size of the collecting element associated with the transmitting region of at least the first picture element is greater than P1 as measured in the row direction.

4. The display device of claim 3, wherein the size of the collecting element associated with the transmitting region of the second picture element and the size of the collecting element associated with the transmitting region of the third picture element are both greater than P1 as measured in the row direction.

5. The display device of claim 1, further comprising a color filter layer including red, green and blue color filters, which are arranged in a striped pattern.

6. The display device of claim 1, wherein the collecting elements make up an array of microlenses.

7. The display device of claim 1, wherein each said picture element has a liquid crystal layer.

8. The display device of claim 7, wherein each said picture element has a reflecting region to reflect the light that has come from the front of the display device, and wherein the display device selectively conducts a display operation in each of a transmission mode and in a reflection mode.

9. The display device of claim 8, wherein the transmitting region of each said picture element is arranged such that the center of the transmitting region substantially matches that of the beam spot.

* * * * *